United States Patent

Jones et al.

[15] 3,655,002
[45] Apr. 11, 1972

[54] ELECTRONIC WEIGHING SYSTEM FOR BATCHING OPERATIONS

[72] Inventors: William H. Jones, Villar Park; Martin W. Hamilton, Arlington Heights, both of Ill.

[73] Assignee: The Dole Valve Company, Morton Grove, Ill.

[22] Filed: Sept. 20, 1968

[21] Appl. No.: 761,087

[52] U.S. Cl. .............................................. 177/70, 177/210
[51] Int. Cl. .................................................. G01g 19/22
[58] Field of Search ................................ 177/70, 210, 116

[56] References Cited

UNITED STATES PATENTS

| | | |
|---|---|---|
| 2,868,491 | 1/1959 | Thorsson et al. ...................... 177/70 |
| 2,938,701 | 5/1960 | Thorsson et al. ...................... 177/70 |
| 3,106,974 | 10/1963 | Williams, Jr. ........................... 177/70 |
| 3,125,176 | 3/1964 | Bale, Jr. et al. ......................... 177/70 |
| 3,173,504 | 3/1965 | Thorsson et al. ...................... 177/70 |
| 3,173,505 | 3/1965 | Thorsson et al. ...................... 177/70 |
| 3,203,591 | 8/1965 | Daulton et al. ...................... 177/70 X |
| 3,217,927 | 11/1965 | Bale, Jr. et al. ..................... 177/70 X |
| 3,221,828 | 12/1965 | Kohler ................................ 177/70 X |
| 3,263,761 | 8/1966 | Boadle et al. ........................... 177/70 |
| 3,434,556 | 3/1969 | Bale, Jr. .................................. 177/70 |

Primary Examiner—Richard B. Wilkinson
Assistant Examiner—George H. Miller, Jr.
Attorney—Hill, Sherman, Meroni, Gross & Simpson

[57] ABSTRACT

An electronic weighing system for batching operations which includes a load cell for weighing a principal container which receives a number of ingredients from individual ingredient sources. The load cell generates an output signal in proportion to the instantaneous weight received in the container, and this signal is utilized to turn "off" one ingredient channel and to actuate a second channel. The output from the load cell is compared with an input signal associated with each channel which determines the loading which is to be added to the container from each ingredient channel. The input load signal for each channel is derived respectively from a number of potentiometers which are coupled in series in such a way as to provide the correct input comparison signal to produce the proper load output for each ingredient channel. This is accomplished by successively switching into series arrangement each new channel after the loading requirements of the previous channel have been satisfied. In this way, the input signal established at each channel in combination with the input signals of previously operated channels always exceeds the load cell output signal by a magnitude just sufficient to be satisfied by the predetermined ingredient loading demands of the channel in operation.

12 Claims, 3 Drawing Figures

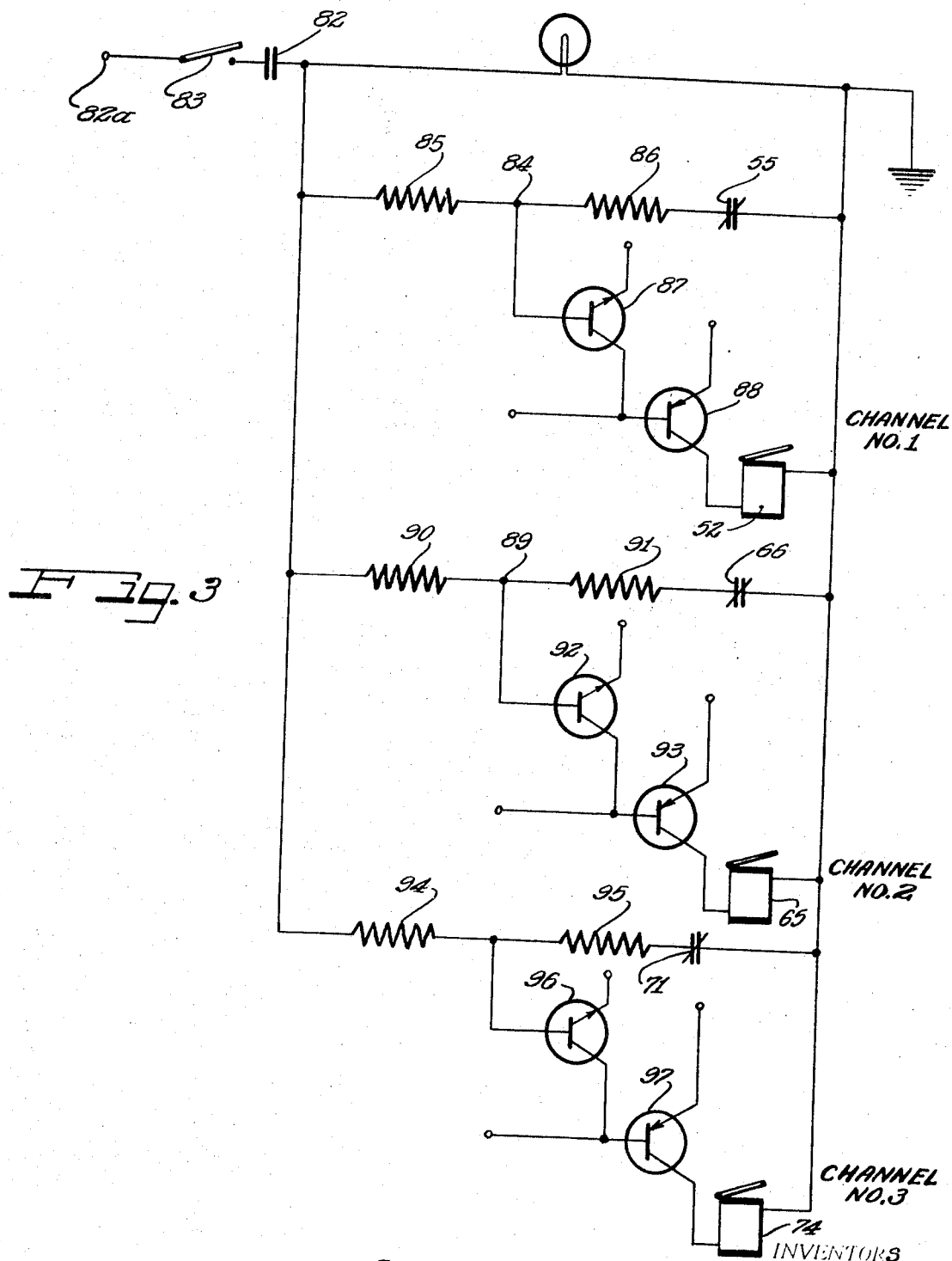

ELECTRONIC WEIGHING SYSTEM FOR BATCHING OPERATIONS

BACKGROUND OF THE INVENTION

1. Field of the Invention

The field of art to which this invention pertains is an electronic system for continuously monitoring the weight of ingredients being fed into a common container and for controlling a series of operational stations in response to the changing loading of the container to assure proper feeding proportions of the respective ingredient input channels.

2. Summary

It is an important feature of the present invention to provide an improved electronic weighing system for batching operations.

It is also a feature of the present invention to provide a highly efficient control circuit to regulate the operation of a series of ingredient channels for supplying predetermined quantities of specified ingredients to a common container.

It is an important object of the present invention to provide an improved control circuit utilizing the output of a load cell as a means of triggering a number of operational stations for supplying preselected quantities of specified ingredients to a container, the weight of which is being sensed by the indicated load cell.

It is another object of the present invention to provide a control circuit having a series of input selection units which are connected in series with the output of a load cell and which are selectively connected into series with each other in response to a null condition being received at a previously connected load selection unit.

It is also an object of the present invention to provide a control circuit which utilizes the continuous output from a load cell in series with a number of serially connected potentiometers wherein each of the potentiometers has an output signal equal to the combined signals of the load cell output and a reference signal applied to the potentiometer.

It is a further object of the present invention to provide an electronic control circuit including a number of potentiometers having a fixed reference voltage applied threreacross and having the output from a load cell coupled to one terminal of the potentiometer such that the output from the load cell adds algebraically to the utilized portion of the reference signal applied to the potentiometer for controlling the operation of an ingredient feeding station and for switching an additional potentiometer into series connection with the system to actuate the same and deactuate the previous ingredient feeding channel.

It is an additional object of the present invention to provide an interlock circuitry for an electronic control network as described above wherein a holding circuit maintains each channel in an inoperative state after once having completed its cycle until all of the ingredients of the container being sensed are removed and the weight being sustained by the load cell is relieved.

It is another object of the present invention to provide an amplifier for each of the respective ingredient channels which amplifiers have a high input impedance for drawing substantially zero current from said potentiometers.

These and other objects, features and advantages of the present invention will be understood in greater detail from the following description and the associated drawings wherein reference numerals are utilized in designating an illustrative embodiment.

BRIEF DESCRIPTION OF THE DRAWINGS

FIG. 3 is a schematic of the interlock circuitry of the present invention which is utilized to maintain each respective channel in an inoperative state, after once having been cycled, until the principal ingredient receiving container is emptied.

DESCRIPTION OF THE PREFERRED EMBODIMENT

The weighing system of the present invention may consist, for example, of a hopper which is supported by a load cell or series of load cells which, in turn, generates an output signal indicative of the load received by the hopper. A number of ingredient feeding stations may be oriented directly above the hopper to supply material being mixed to the hopper in accordance with a predetermined composition.

Essentially, the control circuit of the present invention turns "on" a first ingredient feeding station and allows material to be fed to the hopper until the weight as registered by the load cell reaches the preselected weight of material for that particular ingredient. At that time, the first feeding station is turned "off," and a second feeding station is turned "on" for introducing a second ingredient into the hopper. When the hopper reaches the desired weight in accordance with the load already supplied by the first ingredient feeding station and the load required by the second station, the second feeding station is turned "off" and subsequent feeding stations are initiated.

The circuit of the present invention provides an efficient and effective means for accomplishing this function by providing a series of potentiometers which effectively introduce an input control signal to each ingredient feeding station which signal must be counterbalanced by the output of the load cell to turn "off" that station and to transfer operation to a subsequent channel.

More specifically, when the voltage input or reference signal corresponding to the first channel is balanced or nulled by the output of the load cell, indicating that a full measure of the first ingredient has been supplied to the hopper, a second potentiometer is connected in series with the first potentiometer, thereby adding a second reference signal in series with the reference signal associated with the first channel. The combination of the first and second reference signals then exceeds the output of the load cell, and accordingly, the second feeding station is initiated. This process is then repeated for the number of feeding stations which are required to develop the specified composition of materials.

After the last feeding station has fulfilled its demand requirements, the hopper is ready to be emptied. The emptying of the hopper, of course, reduces the output signal of the load cell and would tend to re-engage each of the ingredient feeding stations. To prevent re-engagement during emptying of the hopper, a zero interlock circuit is provided which holds each of the channels in a deenergized state until all of the contents of the hopper have been removed. At this time, the entire cycle may be repeated.

Figure 1:
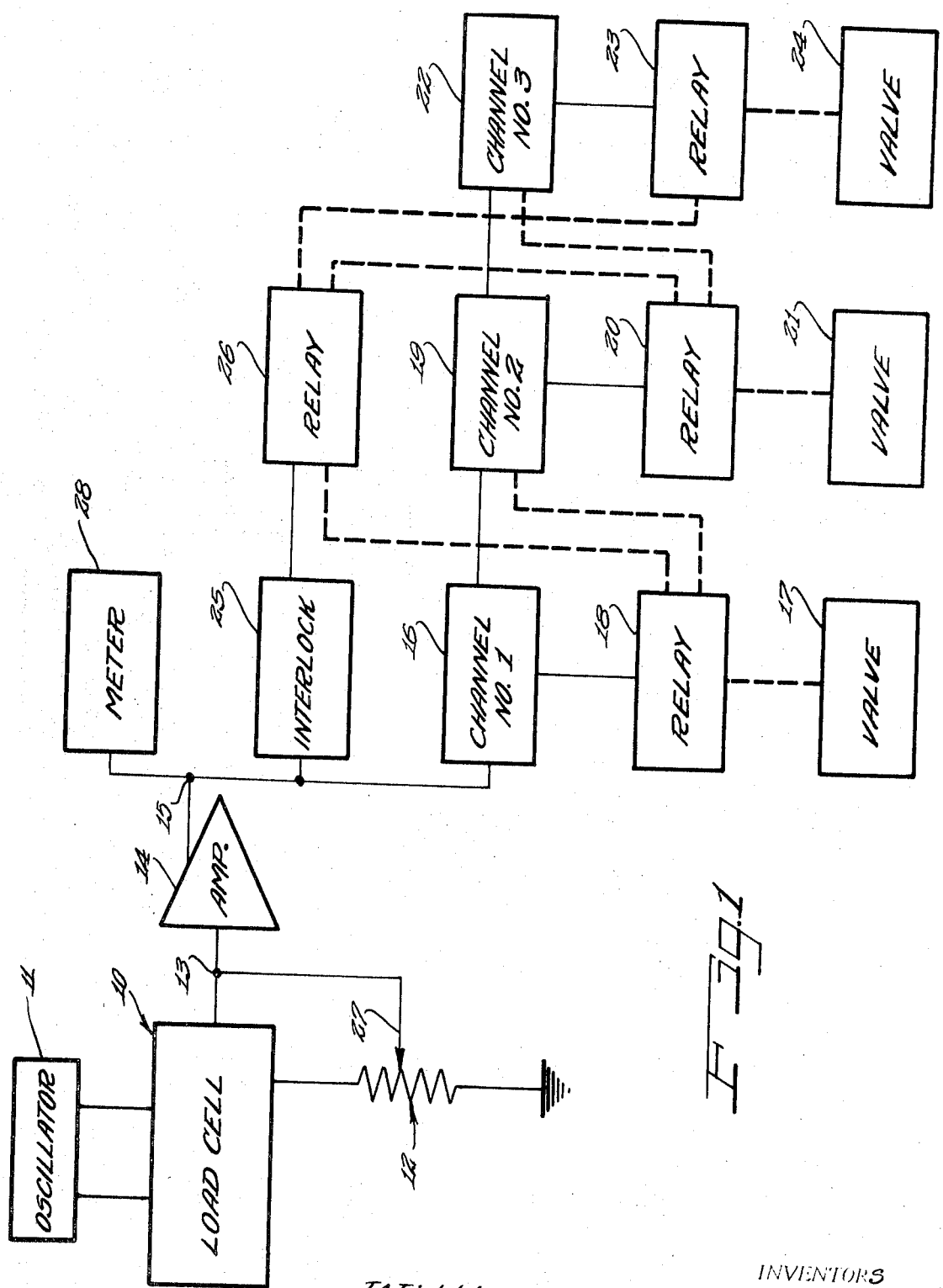
FIG. 1 is a block diagram illustrating the functional relationship of the various components comprising the electronic control circuitry of the present invention.

Referring specifically to the block diagram shown in FIG. 1, a load cell 10 is shown to be supplied by an oscillator 11 at a frequency, for instance, of approximately 2,500 Hz. A balance potentiometer indicated generally at 12 is provided to null out the output signal as developed at circuit point 13 under no-load conditions. The balance control 12 may balance out the weight of the hopper, for instance, and other associated apparatus permitting the load cell assembly to generate a signal which is indicative of the weight of the ingredients alone.

The output signal from the load cell and balance network is coupled from the point 13 to an amplifier 14 and from the amplifier 14 to a circuit junction point 15. The amplified load indicative signal is then coupled to a first channel 16. The channel 16 controls a valve 17 through a relay 18 and determines the weight of ingredients added to the hopper.

When the load cell 10 senses that the full measure of ingredient from the first channel has been fed into the hopper, the valve 17 is closed, and the relay 18 couples a second channel 19 into series with the first channel 16. In a similar manner, the second channel is provided with a relay 20 and a control valve 21. When the desired quantity of ingredient from the second channel is received into the hopper, a null condition is developed in the second channel 19 for actuating the relay 20 and closing the second ingredient valve 21. At the same time, the relay 20 couples a third ingredient channel 22 into series engagement with channel 1 and channel 2.

The third channel is provided with a relay 23 and a valve 24 and operates in a manner similar to the operation of channels 1 and 2. The process may be repeated for a number of channels corresponding to the number of ingredients required for the given mixture.

Each of the relays 18, 20 and 23 include a holding circuit for maintaining the relay in an energized condition after once having been energized at the time of the turning "off" of the respective channel. This holding circuit is released by means of an interlock circuit 25 which is coupled to a control relay 26. The relay 26 is in turn coupled to each of the relays 18, 20 and 23 such that the opening of the relay 26 releases the respective holding circuits thereby placing the channel transfer circuits in a ready position for a subsequent cycle.

Regarding the balancing network 12 for balancing out system weight, a movable tap 27 is provided to adjust the balancing signal applied to the circuit point 13. The tap 27 may be adjusted until a zero output signal is provided at the circuit junction point 15 as indicated by a meter 28.

Figure 2:
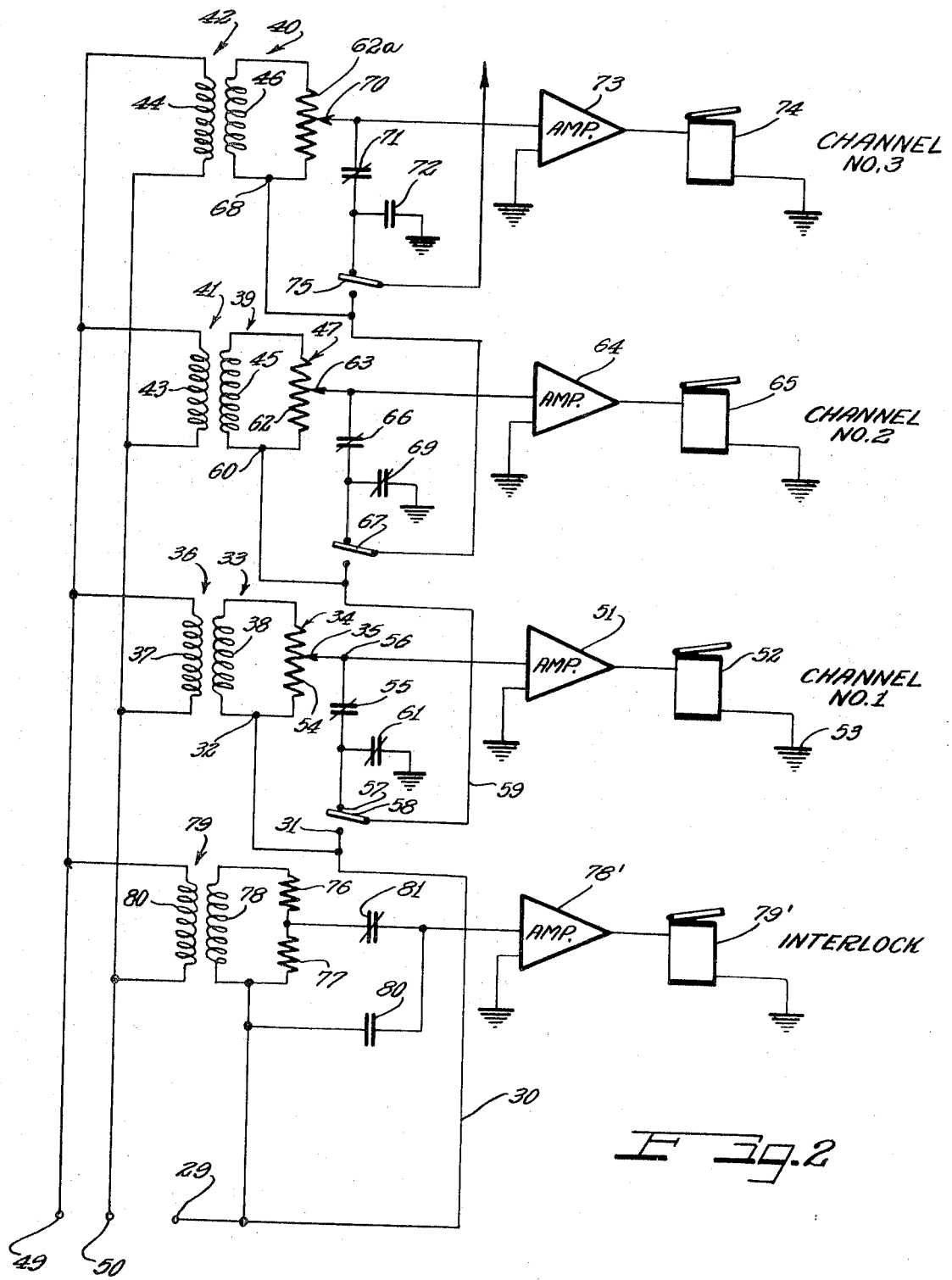
FIG. 2 is a schematic of the channel transfer circuitry showing the individual channel load selection units or potentiometers and the associated relays for connecting the same in series with each other and with the load cell output.

Referring to FIG. 2, the output from the amplifier 14 is indicated generally at terminal 29. This output signal is then fed through a circuit line 30 and through a contact 31 to a terminal 32 at a potentiometer 33.

The potentiometer 33 includes a resistor 34 and a movable tap 35. A transformer 36 couples a reference signal from a primary winding 37 to a secondary winding 38. The output of the secondary winding 38 is applied directly across the resistor 34, and a portion of this reference signal is developed between the terminal 32 and the movable tap 35.

The potentiometer 33 corresponds to the load selection unit for channel 1. Similar potentiometers 62 and 62a are provided for the load selection units of channels 2 and 3, respectively. Each of the potentiometers 62 and 62a are provided with input transformers 41 and 42 respectively. These transformers have primary windings 43 and 44 and secondary windings 45 and 46 for coupling the indicated reference signal across the respective resistors 47 and 48. Each of the primary windings 37, 43 and 44 are connected in parallel and a reference signal is applied thereto at a pair of terminals 49 and 50. The signal which is developed across the secondary windings 38, 45 and 46, respectively, consist of an AC signal equal in frequency to the frequency applied to the load cell and 180° out of phase therewith.

Referring specifically to the first channel, the movable tap 35 which senses the combined signals developed from the load cell at the terminal 29 and from the reference signal, is coupled directly to an amplifier 51 which in turn controls a relay 52, the relay 52 being coupled to ground as at 53.

In operation, initially, the load cell produces zero output signal when the hopper or receiving container is empty. The reference signal as applied between the movable tap 35 and the terminal 32, then develops a signal for turning "on" the amplifier 51 and turning the relay 52 "off." At this time, the ingredient associated with the first channel begins to flow into the hopper, thereby adding weight to the load cell. The gradually increasing weight in the hopper generates a signal at the terminal 29 which opposes the signal across the resistive portion 54 between the movable tap 35 and the terminal 32. When a null condition is reached, the required load from channel 1 has been received within the hopper and means must be provided to switch operation to a succeeding channel. It is apparent, then that the quantity of material being delivered from channel 1 can be adjusted by adjusting the movable tap 35 thereby increasing or decreasing the voltage drop across the resistive portion 54 of the resistor 34.

Initially, a relay contact 55 which is coupled from a circuit point 56 to a circuit point 57 is normally open. However, the turning "on" of the relay 52 closes the relay contact 55 and couples the terminal 57 directly to the movable tap 35. The terminal 57 is coupled through a normally closed switch 58 and a circuit line 59 to a circuit junction point 60 at the potentiometer 47 which corresponds to the circuit junction point 32 associated with the potentiometer 54. A second relay contact 61 which is normally closed is opened by the actuation of the relay 52.

As in the case of channel 1, the resistor 47 has a resistive portion 62 coupled between a movable tap 63 and the circuit junction point 60. The movable tap may be adjusted to develop the desired signal across the portion 62 which is utilized to control the quantity of ingredient which is fed from channel 2 to the receiving hopper.

At the time of the closing of the relay contact 55, which as is shown, connects the potentiometer 47 in series with the movable tap 35 and with the resistive portion 54, the voltage across the portion 54 was exactly counterbalanced by the voltage developed at the output 29 of the load cell and amplifier combination. Due to the added input voltage introduced by the resistive portion 62, an amplifier 64 associated with the potentiometer 47 and a relay 65 will continue to function and add ingredients to the receiving hopper until the output of the load cell attains a new level as reflected by the combined voltages of the resistive portions 54 and 62.

When the supply of ingredients from the channel 2 satisfies the requirements of the potentiometer setting associated therewith, a null condition will be attained at the movable tap 63, thereby turning "off" the amplifier 64 and turning "on" the relay contact 65, and hence, turning "on" a relay contact 66 and connecting the movable tap 63 through a switch 67 to a terminal point 68 associated with the potentiometer 62a. Similar to the relay contact 61, the relay contact 69 is opened, thereby allowing a series connection between the movable tap 63 and a movable tap 70 of the potentiometer 62a. The potentiometer 62a is provided with relay contacts 71 and 72 which correspond to relay contacts 66 and 69, respectively, of potentiometer 47 for coupling the signal as developed at the movable tap 70 to subsequent channels. The movable tap 70 is coupled to an amplifier 73 and to a relay 74 which corresponds to like parts in the preceding channels.

The potentiometer 62a is also provided with a switch 75 similar to the switches 58 and 67. These switches allow any one channel or combination of channels to be removed from the sequence of operation. This is accomplished simply by moving the respective switches from their normally closed position as shown to a position contacting the opposing terminal, such as the terminal 31 associated with the switch 58.

Each of the amplifiers 78, 51, 64 and 73 have a high input impedance. This high input impedance means that the respective amplifiers will draw substantially zero current. In this way there will be substantially no IR drop across the resistors 48, 47, 34, 76 and 77. Hence, the amplifiers will be responsive only to the voltage developed at the output of the load cells, thereby eliminating error due to the presence of current in the indicated potentiometers and amplifiers. In the preferred embodiment herein this high input of impedance is achieved by the MOS-FET transistor which is well known in the art to have a high input impedance.

The interlock feature illustrated at reference numeral 25 in FIG. 1 is shown schematically in FIG. 2 as including a pair of resistors 76 and 77 coupled across a secondary 78 of a transformer 79. The primary 80 of the transformer 79 is coupled in parallel with each of the primaries 37, 43 and 44, and accordingly, the reference signal as applied at the terminals 49 and 50 is applied across the resistors 76 and 77. Only a small portion of the reference voltage is developed across the resistor 77 which determines the "on" point for the interlock. After the interlock is "on," relay contact 80 closes, connecting amplifier 78' directly to circuit point 29. Amplifier 78' and relay 79' and its contact 80 are held in an "on" condition until substantially all of the weight is removed from the receiving hopper.

The relay contact 82 of the relay 79' is shown in FIG. 3 along with a bias input terminal 82a. The circuit in FIG. 3 shows a series of holding circuits associated with each channel, and shows the means for releasing these holding circuits as consisting essentially of the relay contact 82 which when opened removes a positive bias otherwise applied at the terminal 82a. A main switch 83 is provided in the circuit to connect or disconnect the interlock circuit from the network as desired.

Referring to channel 1, once the relay contacts 55 are closed, a signal is developed at the circuit junction point 84 intermediate a pair of resistors 85 and 86 for biasing "on" a transistor 87 which in turn biases "on" a second transistor 88 thereby maintaining the energization of the relay 52. Accordingly, once the contacts 55 are closed, the holding circuit maintains the relay in a closed condition until the bias is removed from the transistors 87 and 88 by the opening of the relay contacts 82. As explained, these contacts are opened in response to the deenergization of the relay 79' as shown in FIG. 2.

In a similar manner, the relay 65 is maintained in an "on" condition once the contacts 66 have been closed due to a positive bias which is supplied to the circuit junction point 89 through the resistors 90 and 91. Accordingly, the transistors 92 and 93 are maintained in an "on" condition thereby holding "on" the relay 65.

Channel 3 is provided with corresponding resistors 94 and 95 and corresponding transistors 96 and 97 to hold "on" the relay 74 once the contacts 71 have been closed. It is apparent then that the respective holding circuits for each of the channels together with the relay contact 82 provides a means for preventing the actuation of any channel, after that channel has once been actuated and prior to the emptying of the principal receiving hopper.

It will be apparent to those skilled in the art that various modifications and combinations of the features of our invention may be readily achieved, but we desire to claim all such modifications and combinations as properly come within the scope and spirit of our contribution as set forth herein.

We claim as our invention:

1. An electronic weighing system for batching operations comprising:
   a load cell and means for generating an output signal therefrom,
   container means being weighed by said load cell, a series of feed station means for feeding material into said container means,
   a plurality of potentiometers including an impedance element having a constant voltage source applied thereacross and a movable tap associated with said impedance element,
   a trigger circuit means associated with each of said potentiometers and being coupled to an associated feed station and including a high input impedance amplifier,
   the output of said load cell being coupled to one terminal of said impedance elements,
   said trigger circuit being responsive to the combined signals of said load cell and said impedance element at said movable tap for activating and deactivating said associated feed station, and
   means for coupling a second one of said impedance elements in series with a portion of said first impedance element between said movable tap and said one terminal in response to the deactivation of said feed station associated with said one impedance element, said means for coupling including a relay connected to and triggered by said high input impedance amplifier and having contacts serially interposed between said one impedance element and said second impedance element.

2. An electronic weighing system for batching operations comprising:
   a load cell and means for generating an output signal therefrom,
   container means being weighed by said load cell a series of feed station means for feeding material into said container means,
   a plurality of potentiometers including an impedance element having a constant voltage source applied thereacross and a movable tap associated with said impedance element,
   a plurality of trigger circuit means each associated with a separate one of said potentiometers and being coupled to an associated feed station, the output of said load cell being coupled to one terminal of one of said impedance elements,
   the trigger circuit associated with said one impedance element being responsive to the combined signals of said load cell and said one impedance element at said movable tap for activating and deactivating said associated feed station, and
   means for coupling a second one of said impedance elements in series with the portion of said first element between said movable tap and said one terminal in response to the deactivation of said feed station associated with said one impedance element.

3. A circuit in accordance with claim 2 wherein interlock means are provided and coupled to and operated by a constant voltage source for holding said coupling means closed until said load cell is substantially unloaded.

4. A circuit in accordance with claim 3 wherein said interlock means comprises a reference potential source in parallel with said potentiometers and in series with said load cell output signal, means for holding said coupling means closed and trigger means responsive to both said reference potential and said load cell output signal to actuate said holding means.

5. A control circuit comprising:
   load sensitive means for generating an output signal indicative of the load received thereon,
   a plurality of load selection units, each of said load selection units being connected in series with each other,
   means for applying the output signal from said load sensitive means to one of said load selection units, means for coupling said output signal to another one of said load selection units through said one load selection unit, and
   a plurality of operational means coupled to individual ones of said load selection units, each of said operational means having a cycle of operation and being responsive to its associated load selection unit to regulate the load received at said load sensitive means, means for disconnecting said other one of said load selection units from said one unit during the cycle of operation of said one unit and for connecting said other unit to said one unit subsequent to the cycle of operation of said one unit.

6. A control circuit in accordance with claim 5 wherein each of said load selection units comprises a potentiometer and means for applying a reference signal across the same,
   said potentiometer being adjustable to selectively establish an operation voltage point for the associated operational means.

7. A control circuit in accordance with claim 6 wherein each of said potentiometers has a reference point, means for applying the output of said load sensitive means to said reference point and means for developing a portion of said reference signal between the point of coupling of said operational means and said reference point which portion is 180° out of phase with the output of said load sensitive means.

8. A control circuit in accordance with claim 7 wherein the operational means associated with said one load selection means is normally operative until the output of said load sensitive means equals said portion of said reference signal.

9. A control circuit comprising:
   a load cell and means for developing an output signal in response to the loading of said cell,
   a plurality of voltage selected input signal means, each signal having an instantaneous polarity opposed to the polarity of the output of said load cell, means for connecting one of said voltage selected input signals in series with said load cell output, first operational means responsive to the combined one input and load cell output signal to control the loading of said load cell, said first operational means having a high input impedance, means for disengaging said first operational means when a first predetermined loading is attained on said load cell and for coupling a second voltage selected input signal into series relation with said one input signal, second operational means responsive to the combined one input, second input and load cell output signal to control the further loading of said load cell, and means for disengaging said second operational means when a second predetermined loading is attained on said load cell.

10. A control circuit in accordance with claim 9 wherein said voltage selected input signal means comprises a potentiometer, a constant signal source being applied across said potentiometer and a movable tap thereon for determining the magnitude of the selected input signal.

11. A control circuit in accordance with claim 10 wherein the output of said load cell is coupled to one terminal of one of said potentiometers and wherein the signal developed between the movable tap thereof and said one terminal combines with the output signal from said load cell to develop a trigger signal, and wherein said trigger signal is applied to the input of said first operational means.

12. A control circuit in accordance with claim 11 wherein said means for coupling said second voltage selected input signal into series relation with said one input signal comprises a normally open switching means coupled between said movable tap of said one potentiometer and one terminal of another of said potentiometers and wherein means are provided to close said switching means in response to the deactuation of said first operational means.

* * * * *